Patented Apr. 29, 1930

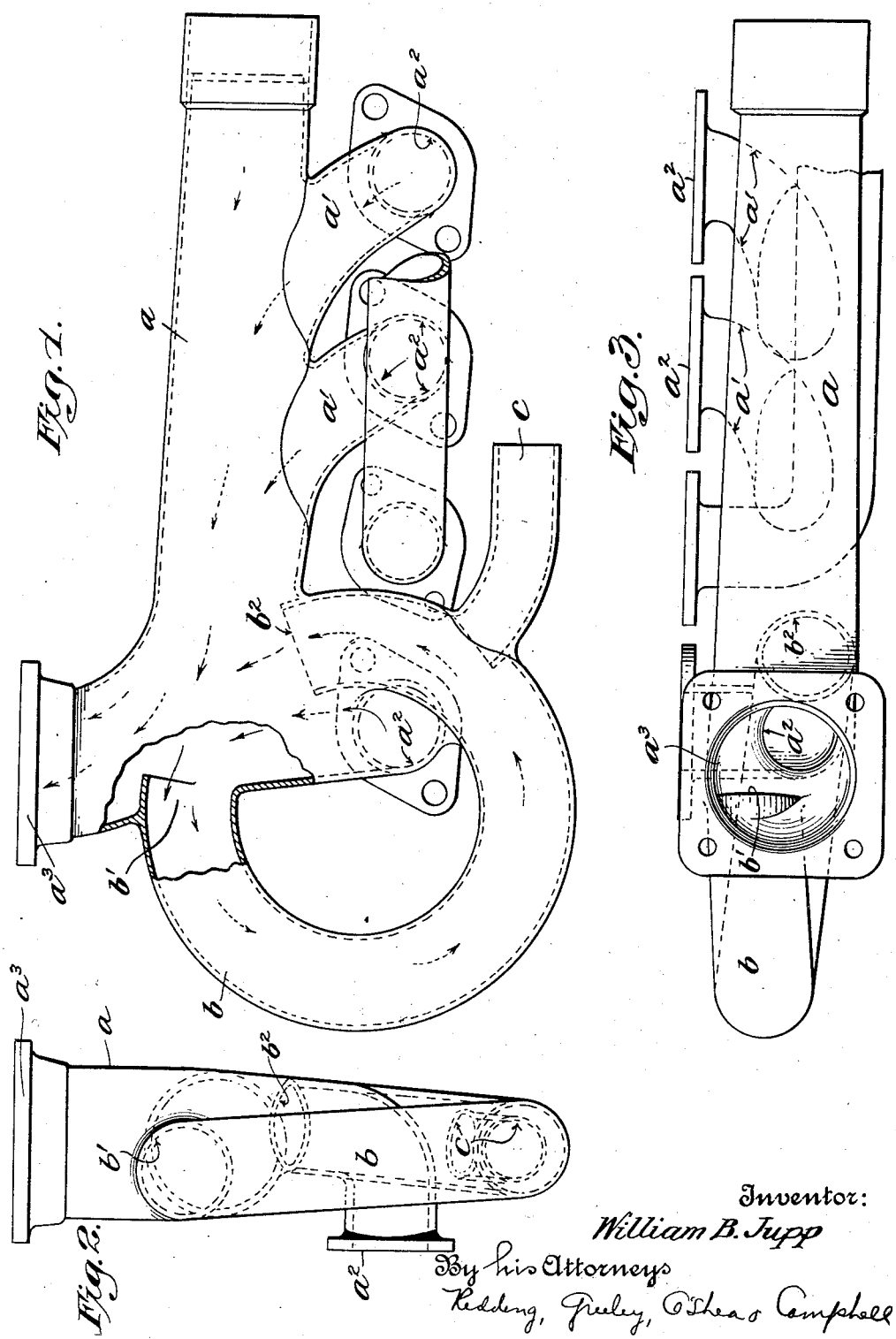

1,756,465

UNITED STATES PATENT OFFICE

WILLIAM B. JUPP, OF NEW YORK, N. Y., ASSIGNOR TO INTERNATIONAL MOTOR COMPANY, OF NEW YORK, N. Y., A CORPORATION OF DELAWARE

EXHAUST MANIFOLD

Application filed March 12, 1928. Serial No. 260,855.

The present invention relates to devices for deadening, or reducing the noise due to the explosions in the exhaust of an internal combustion engine. It relates particularly to exhaust manifolds which are constructed to cause the wave motion of a part of the exhaust gases to reduce, or counteract the wave motion of the exhaust gases and thus reduce the impact of the exhaust waves on the manifold pipe. It has long been known that the manifold pipe resonates and transmits such noises to the frame of the vehicle and the atmosphere, and various devices, such as jackets, shields and mufflers have been devised to reduce such noise.

This invention relates to a device which is formed integral with the manifold and withdraws a portion of the exhaust gases from the normal gas flow and returns the gases thereto at a point where the wave motion thereof destroys the wave motion of the remainder of the exhaust gases. In the specific embodiment of the invention, a hollow annular ring has been formed with the manifold structure and communicating with the exhaust passage. Gases are withdrawn from the manifold at a suitable point and after passing through the ring are returned at another point into the exhausting flow. The proper designing of the characteristics of this hollow annular ring will produce a deadening effect on the wave motion of the exhaust gases and quieter operation will result.

As a further consideration the invention contemplates the provision of a device which is formed integral with the exhaust manifold and so designed that no additional space is required over that usually provided for the manifold structure. In this manner, the device may be used where limitations of space are of primary importance.

The invention will be understood more fully from the following drawings, wherein:

Figure 1 is a view in front elevation, partly broken away, showing the hollow annular ring formed integral with the exhaust manifold.

Figure 2 is an end view of the manifold shown in Figure 1.

Figure 3 is a top plan view of the manifold shown in Figure 1.

Referring to the drawings, $a$ designates one half of a manifold pipe of usual form, having individual pipes $a'$ leading from the exhaust ports $a^2$. The exhaust gases are carried out through the discharge port $a^3$.

Formed integral with the manifold $a$ is a hollow annular ring $b$, communicating with the exhaust manifold at $b'$ to withdraw exhaust gases therefrom, and with the manifold at $b^2$ to return the gases thereto. The size of this ring is such that the wave motion of the gases passing through the ring and returned to the manifold at point $b^2$ will be out of phase with the wave motion of the exhaust gases in the manifold. Due to this condition, the resultant wave motion will be considerably lessened, if not destroyed, and the noise reduced materially.

A pipe $c$ may be formed with the annular ring and carry gases to a heater or other accessory.

It will be apparent that there are many ways in which an auxiliary path for the exhaust gases may be formed and the invention is not to be limited to the specific hollow ring shown, save as defined in the appended claim.

I claim as my invention:

The combination with an exhaust manifold for a multiple cylinder internal combustion engine, said manifold extending parallel to the line of the cylinders and having extensions at angles thereto communicating with the exhaust ports of said engine, the manifold being formed to permit the escape of exhaust gases therefrom at one end only, said end being at an angle to the rest of the manifold, of a three-quarters annular shaped compartment integral with the manifold and communicating therewith so that one end of the annulus is in line with the length of the manifold and the other end is in line with the exhaust end of the manifold.

This specification signed this 9th day of March A. D. 1928.

WILLIAM B. JUPP.